July 8, 1930.  E. G. ANDERSON  1,770,057
TIP BACK CAP FOR MILK BOTTLES
Filed March 28, 1928
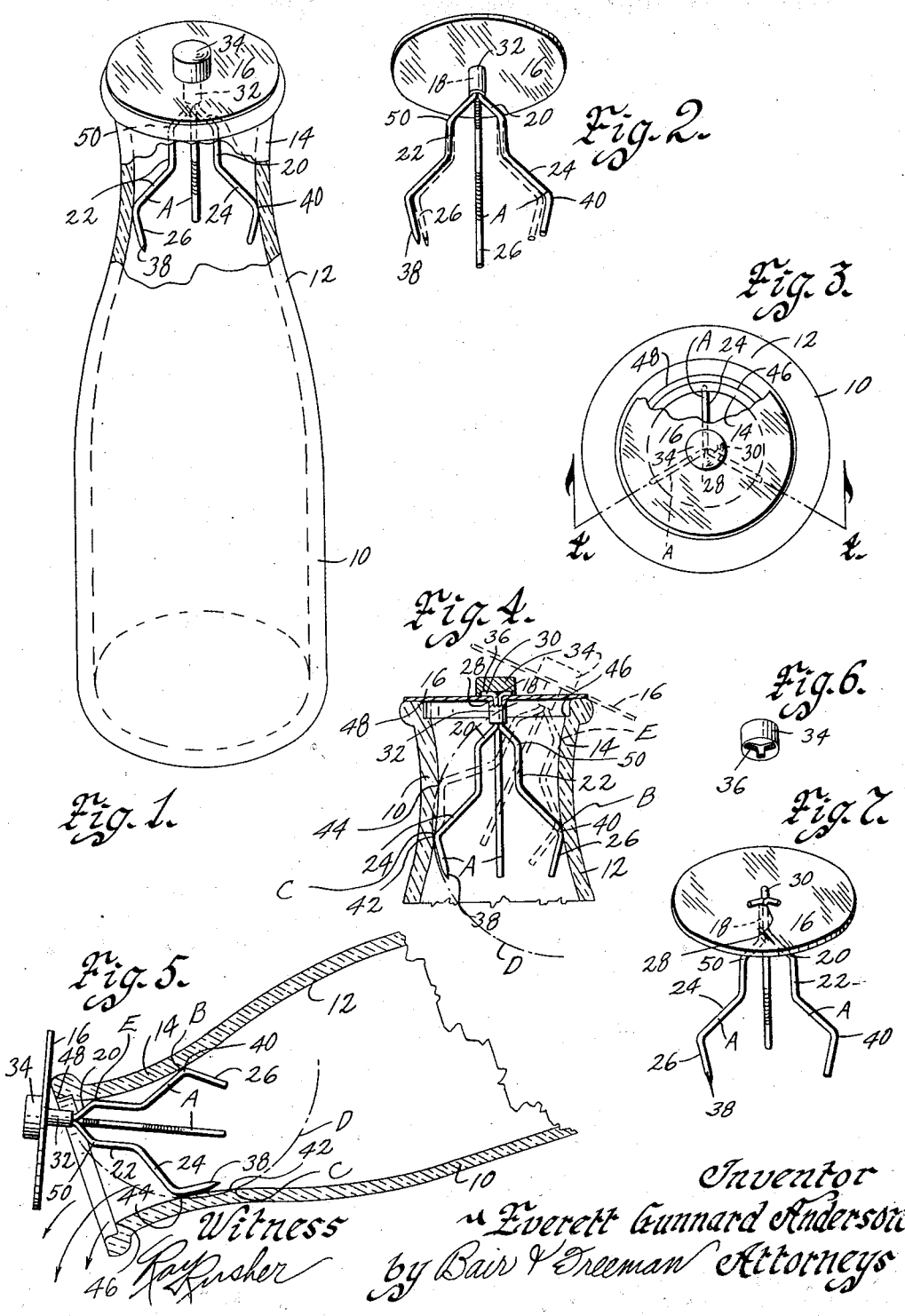
Inventor
Everett Gunnard Anderson
by Bair & Freeman Attorneys
Witness
Ray Fisher Patented July 8, 1930

1,770,057

UNITED STATES PATENT OFFICE

EVERETT GUNNARD ANDERSON, OF DES MOINES, IOWA

TIP-BACK CAP FOR MILK BOTTLES

Application filed March 28, 1928. Serial No. 265,472.

The primary object of my invention is to provide a cap for milk bottles of simple, durable and comparatively inexpensive construction.

A further object is to provide a cap of the kind herein disclosed which may be first used for removing the paper cap ordinarily seated on top of the bottle and to thereafter use my device as a cover for the milk bottle to prevent dirt and the like from getting into the milk after it has once been opened.

More particularly it is my object to provide a bottle cap consisting of a cover member having prongs extending downwardly therefrom for frictionally engaging the inside of the neck of the bottle whereby the cap after being placed in position to cover the bottle, may be moved to a tipped back position without removing the device from the bottle, the prongs serving to retain the cap in this tipped back position.

Still a further object is to provide a cap to replace the much mutilated paper cap which the housewife invariably pushes down in the bottle with the result of the milk splashing from the bottle to say nothing of the contact of the hand with the inside of the bottle itself.

Another important object is to promote sanitation by providing the house wife with a cap that encourages her to keep milk covered because the cap is always on the bottle and can be closed while holding the bottle in the hand, a slight movement of the thumb or forefinger serving to move the cap to closed position.

With these and other objects in view my invention consists in the construction, arrangement and combination of the various parts of my device, whereby the objects contemplated are attained, as hereinafter more fully set forth, pointed out in my claim and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a perspective view of the milk bottle showing my improved tipped back cap in position thereon.

Figure 2 is a perspective view of the cap itself as viewed from the underside.

Figure 3 is a plan view of the cap applied to a milk bottle.

Figure 4 is a sectional view on the line 4—4 of Figure 3 illustrating the cap in closed position and showing it in tipped back position in dotted lines.

Figure 5 is a sectional view similar to Figure 4, showing the cap tipped back and the bottle in position for pouring milk therefrom.

Figure 6 is an underside perspective view of the knob on top of the cap; and

Figure 7 is a perspective view of the cap showing the knob removed therefrom.

On the accompanying drawings, I have used the reference numeral 10 to indicate generally a milk bottle. The milk bottle 10 consists of a main bottom portion having an inwardly directed portion 12 terminating in a neck 14, the sides of which are substantially vertical and slightly curved inwardly.

My particular invention consists of a cover member 16 formed of thin sheet metal or the like and having a plurality of prongs A extending downwardly therefrom. Each prong A comprises a vertical portion 18, an outwardly and downwardly inclined portion 20, a vertical portion 22, a second outwardly and downwardly extending portion 24 and an inwardly and downwardly extending portion 26. The portion 18 of each prong A extends up through an opening 28 formed in the cover member 16 and is then bent outwardly as indicated at 30.

The three portions 18 of the prongs are closely grouped and held in such position by a tubular extension 32 formed on the plate 16. A knob 34 is positioned on top of the cover member 16 and is provided with three radially extending grooves 36 to fit over the outwardly projecting ends 30 of the prongs A. A knob 34 may be spot welded or otherwise secured to the cover member 16 whereby it holds the three prongs A in properly assembled position relative to the cover member and the grooves 36 prevent turning of the prongs A.

In assembling the device, the portions 20, 22, 24 and 26 may be formed on the prongs A after the prongs have been inserted through the opening 28 and through the tube 32. The portions 20 will then tend to hold the tube 32 against the cover member 16 and after the knob 34 has been securely fastened in position. The entire device may be dipped in melted solder for closing all cracks as those occurring between the three portions 18 where they extend through the tube 32. In this way all crevices for the accumulation of dirt will be eliminated.

One of the portions 26 of the prongs A is pointed as indicated at 38 and the purpose of this point is so that the paper cap of the milk bottle may be pierced by the prong and removed. After the desired amount of milk has been obtained from the bottle, the tipped back cap may be easily inserted in position as illustrated in Figures 1 and 4.

In inserting the device into the milk bottle 10 so that the cover member 16 contacts with the top edge of the bottle, the inwardly directed portions 26 serve to contract the prongs so they may enter the neck of the bottle. In this connection, the corner portions or bends 40 occurring between the portions 24 and 26 of the prongs A, describe a circle larger in diameter than the inside diameter of the neck 14 of the milk bottle.

This construction serves to retain the cover member 16 in position due to the corners 40 sliding down past the portion 14 of the milk bottle and then starting to expand along the sloping portion 12. The spring tension of the prongs A will in this manner serve to maintain the cap in position and will actually have a tendency to pull downwardly on the cover member 16 due to the expansion of the prongs as they slide downwardly along the portions 12 of the bottle.

Three or more of the prongs A may be used and the corners 40 being rounded and engaging the tube like inner surface of the milk bottle, serve to form a universal connection between my device and the bottle itself. It will therefore, be obvious that the cover member 16 may be tipped to the position shown in dotted lines in Figure 4 or as shown in full lines in Figure 5. In moving to this position, the point B will act as a fulcrum and the point C will swing about this fulcrum. In swinging in this manner, the point C would if caused to stay at a predetermined position relative to the point B, move on the arc of a circle as indicated at D. However, the slightly curved and substantially vertical portion 14 of the bottle 10, comes within the radius of this circle and therefore in moving from the position shown in Figure 4 to the dotted line position, the point C will first move toward the point B and then outwardly again, being kept against the surface 14 due to the spring action of the prongs A.

At substantially a central position between the point 42 of the surface 14 and the point 44 thereof, the cover 16 will have a tendency to stay in a balanced position but when the point C moves above this central position, the prongs will tend to tip the cap open and when moved below this central position, the prongs will tend to tip the cap closed.

From the foregoing description, it will be obvious that I have provided a cap which is initially centered with respect to the top of the milk bottle by the prongs A and is adapted to snap to a closed position or opened position due to the resiliency of the spring prongs A. The knob 34 may conveniently be manipulated by the thumb or forefinger of an operator while holding the bottle in his hand.

To prevent chipping of the comparatively sharp shoulder 46 and the shoulder 48 formed on the milk bottle, it is necessary to provide for keeping the prongs A away from these shoulders. In order to do this, I provide the portions 20 and 22 with the bends 50 between them which bends contact with the inner surface of the bottle neck as indicated at E, the bottle neck being smooth at this point and substantially flat and the bends E being curved, there is no tendency for the prongs to chip the bottle. Also the resiliency of the prongs themselves serve in a measure to absorb what slight shock occurs when the cover member 16 snaps to opened position.

The portions 18 of the prongs are brought close together so that even in a wide variety of bottles where sizes vary considerably, the tube 32 will not strike on either the shoulder 46 or the shoulder 48 and thereby tend to chip these shoulders. Since all of the prongs are of similar shape, the cap 16 may be tipped in any direction on the neck of the bottle and will serve the same purpose when tipped in any direction.

When the cover member 16 is tipped back as illustrated in Figure 5, a generous opening is left at the neck of the bottle for admitting the milk therein to flow out of the bottle, and the portion 26 of the lower prong A in Figure 5 serves to prevent continued opening movement of the cap due to pressure of the operator's finger or thumb and acts to stabilize or hold the cap in opened position. Without the portion 26, the cap would have a tendency to continue in its opening movement and snap out of the bottle.

Instead of the portions 18 coming together and extending through the tubular portion 32, they may be spaced slightly from each other and the tubular portion eliminated. In this event the prongs A would extend up through separate openings formed in the plate. A construction like this in which all crevices are eliminated, admits of easier cleaning of the cap since the bristles of a brush can then extend in between the portions 18 of the prongs. This also eliminates the operation of soldering of the wires for filling crevices.

Some changes such as slight modifications in the shape of the prongs A may be made and yet these modifications will allow the cap to operate in the manner herein specified and it is my intention to cover by my claim any modified forms of structure or use of mechanical equivalents, which may be reasonably included within their scope.

I claim as my invention:

For use with a bottle having the interior of the neck thereof reduced in diameter at a point spaced below the top thereof and flared outwardly below such reduced diameter, a cap having a plurality of three or more prongs thereon, each prong having a pair of elbows, one slightly spaced from the cap and the other spaced farther therefrom, the first one being slightly spaced from the axis of the cap and the other spaced farther therefrom, whereby the lower elbows serve to engage said neck below such reduced diameter and to thereby maintain the cap in closed position while certain said upper elbows in conjunction with part of the lower elbows which engage the neck above such reduced diameter when the cap is open serve to maintain the cap in such open position.

Des Moines, Iowa, March 20, 1928.

EVERETT GUNNARD ANDERSON.